(12) United States Patent
Yamashita et al.

(10) Patent No.: US 6,301,214 B1
(45) Date of Patent: *Oct. 9, 2001

(54) DISK DEVICE

(75) Inventors: Tatsumaro Yamashita, Miyagi-ken; Sadayuki Ishii, Fukushima-ken, both of (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/009,646

(22) Filed: Jan. 20, 1998

(30) Foreign Application Priority Data

Jan. 23, 1997 (JP) .................................................. 9-009938

(51) Int. Cl.[7] .................................................. G11B 33/02
(52) U.S. Cl. ............................................................ 369/77.2
(58) Field of Search ................................ 369/77.1, 77.2, 369/75.1, 75.2

(56) References Cited

U.S. PATENT DOCUMENTS

| 4,899,238 | 2/1990 | Inoue et al. | 360/99.05 |
|---|---|---|---|
| 5,119,358 | 6/1992 | Soga | 369/77.2 |
| 5,146,447 | 9/1992 | Nagasato et al. | 369/77.2 |
| 5,299,185 | * 3/1994 | Sakurai et al. | 369/75.2 |
| 5,737,293 | * 4/1998 | Kawamura et al. | 369/77.1 |

FOREIGN PATENT DOCUMENTS

| 0 200 705 A2 | 4/1986 | (EP) . |
|---|---|---|
| 0 273 510 A2 | 12/1987 | (EP) . |
| 0 375 988 A1 | 11/1989 | (EP) . |
| 0 518 259 A2 | 6/1992 | (EP) . |
| 0 576 253 A2 | 6/1993 | (EP) . |
| 0 645 768 A2 | 9/1994 | (EP) . |
| 0 696 797 A2 | 8/1995 | (EP) . |
| 5-303816 | 11/1993 | (JP) . |

* cited by examiner

Primary Examiner—Brian E. Miller
Assistant Examiner—Tod Kupstas
(74) Attorney, Agent, or Firm—Brinks Hofer Gilson & Lione (57) ABSTRACT

A pair of positioning arms are arranged in a housing, and positioning members are fixed to the positioning arms, respectively. The positioning arms are biased in a direction in which the positioning members become close to each other in response to the elastic force of a biasing member. When a cartridge is inserted, the positioning members are fitted in recessed portions to position the cartridge. When the disk is inserted, the disk is positioned by the positioning members. Both the cartridge and the disk can be positioned by a common positioning mechanism.

11 Claims, 7 Drawing Sheets

DISK DEVICE

BACKGROUND OF THE INVENTION

1. Field of the Invention

The present invention relates to a disk device in which both a cartridge in which a disk is accommodated or a single disk which is not accommodated in a cartridge can be inserted and, both the media can be positioned at positions where the media can be driven.

2. Description of the Related Art

Figure 7A:
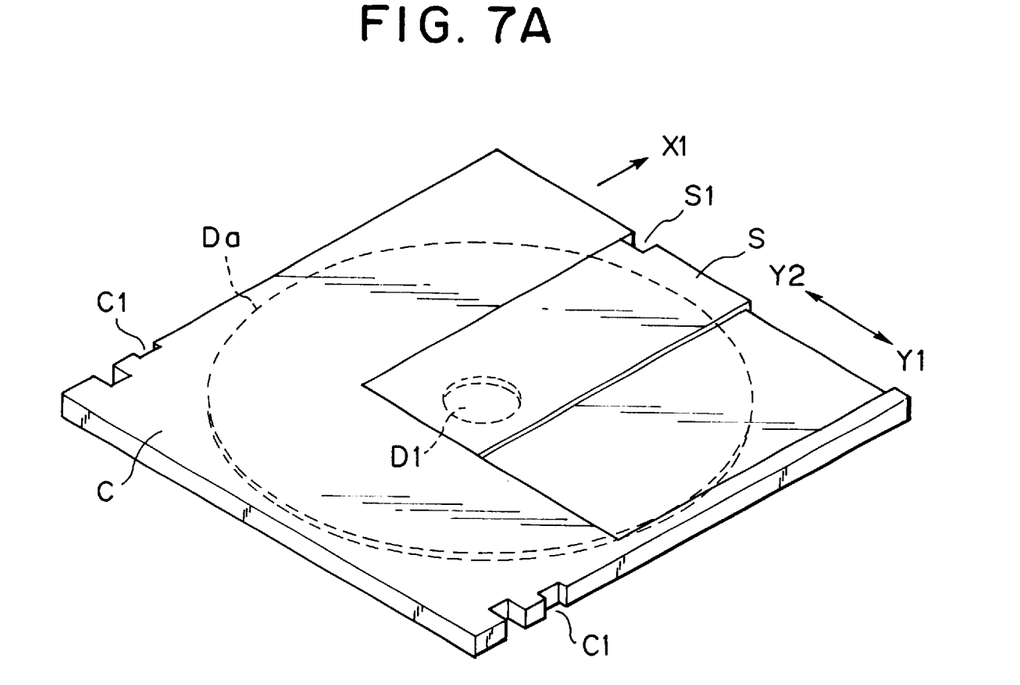
FIG. 7A is a perspective view showing a cartridge in which a disk is accommodated.
Figure 7B:
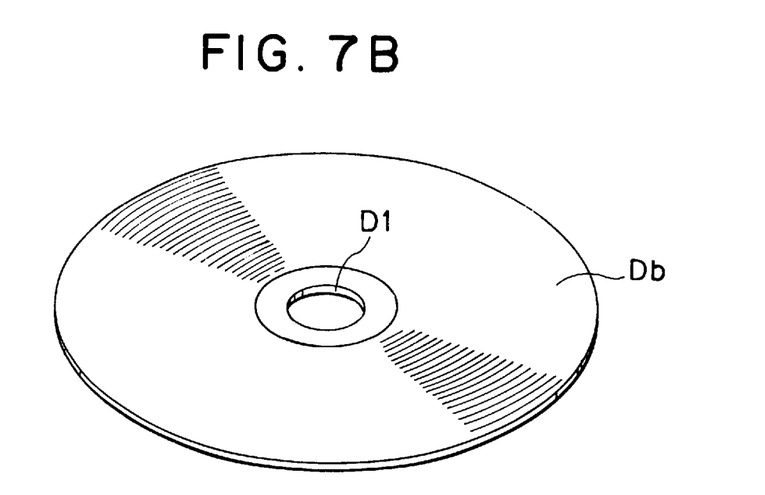
FIG. 7B is a perspective view showing a single disk.

As a recording medium using an optical recording scheme, a photomagnetic recording scheme, or a phase-change recording scheme, a disk Da which is accommodated in a cartridge C, as shown in FIG. 7A, or a single disk Db which is not accommodated in a cartridge, as shown in FIG. 7B is used.

As a disk device on which the single disk Db is loaded shown in FIG. 7B, there is a disk device which comprises a tray extending from the front of the device and in which the tray is drawn into the device after the disk Db is placed on the tray, and the disk Db is clamped by the turntable of a drive unit.

In a CD player or the like for vehicle, a convey roller is arranged on the inside of an insertion port, the disk Db inserted from the insertion port is drawn into the device by the rotation force of the convey roller, and then the central portion of the disk Db is placed on the turntable. The disk Db which has been reproduced is extracted from the insertion port by the convey roller.

As a disk device in which the cartridge C shown in FIG. 7A is loaded, a disk device having the following arrangement is known. That is, a cartridge C is pressed with a hand to be inserted into the device, and the disk Da in the cartridge C is placed on a turntable. In extraction, an extraction lever or the like arranged outside the device is operated with a hand, and the cartridge C is extracted from the device by the operation force of the extraction lever.

As a disk device on which the cartridge C is loaded, a disk device having the following arrangement is known. That is, when the cartridge C is inserted, a drawing member is hooked on the cartridge C, the cartridge is drawn into the device by the drive force of a motor. When reproduction or the like is completed, the cartridge C is extracted by an operation force in a direction opposing the direction of the drawing member.

As described above, a conventional disk device is either one of a device on which only one of the cartridge C shown in FIG. 7A is loaded and a device on which only the single disk Db shown in FIG. 7B is loaded. A device on which both the cartridge C and the single disk Db can be loaded has not been realized.

The reason why the above device cannot be realized is as follows. Since the cartridge C and the single disk Db are different from each other in shape, a positioning reference for positioning the cartridge C at a position where the cartridge C can be driven is different from a positioning reference for positioning a position where the single disk Db can be driven.

SUMMARY OF THE INVENTION

The present invention is to solve the above convention problem, and has as its object to provide a disk device in which both a cartridge and a single disk are positioned, by using a common positioning member, at positions where the cartridge and the single disk can be driven, so that both the cartridge and the single disk can be driven.

According to the present invention, a disk device has an insertion port in which both a cartridge in which a disk is accommodated and a single disk which is not accommodated in a cartridge can be inserted, and is characterized by comprising positioning members which are at standby positions located on both the sides of an insertion path not to prevent the cartridge or the single disk from insertion when the cartridge or the single disk is inserted from the insertion port, are fitted in recessed portions formed in the cartridge when the cartridge is inserted and reaches a position where the single disk in the cartridge can be driven, and are brought into contact with the peripheral portion of the single disk, when the single disk is inserted, to position the single disk at a position where the single disk can be clamped on a turntable.

For example, the disk device comprises: a pair of positioning arms respectively having the positioning members and pivotally supported; a biasing member for biasing the positioning arms in a direction in which the positioning members are brought into contact with the cartridge or the single disk; and a control member for regulating the positioning arms such that the positioning members are located at the standby positions before the cartridge or the single disk is inserted and canceling the regulation of the positioning arms after the cartridge or the single disk is inserted.

In this case, the disk device comprises a stopper for limiting a pivotal operation of the positioning arms when regulation by the control member is canceled and when the positioning arms move in the biasing direction of the biasing member to reach a position where the positioning members can position the single disk, and, when the cartridge is inserted, the positioning members are preferably fitted in the recessed portions before the positioning arms are limited by the stopper.

In the above description, after the single disk is positioned by the positioning members, the peripheral portion of the single disk centered on the turntable and then clamped is separated from the positioning members which are limited by the stopper with respect to position.

In addition, a lock member for locking the control member when the control member regulates the positioning arms is arranged, and, when the cartridge or the single disk is inserted, a locking operation by the lock member is canceled by the insertion force of the cartridge or the single disk.

In addition, the disk device comprises a moving member which is pressed by the cartridge or the single disk when the cartridge or the single disk is inserted to move on a device inner side, a locking operation by the lock member may be canceled by the moving force of the moving member on the device inner side, and the single disk may be positioned at a position where the single disk can be clamped by the moving member reaching a position where the locking operation by the lock member is canceled and the positioning members limited by the stopper.

When the moving member is pressed on the device inner side by the cartridge, a shutter arranged on the cartridge can be opened by the moving member, and a disk in the cartridge can be exposed.

Although the positioning members can be constituted as members arranged on the positioning arms which can be pivoted, for example, the positioning members are arranged such that the positioning members can be linearly slid in Y1–Y2 direction.

The positioning members or the positioning arms are directly biased by a biasing member in a direction in which the positioning members or the positioning arms are brought into contact with a cartridge or a single disk, or a stopper for limiting the positions of the positioning arms or the positioning members at positions where the single disk can be positioned may be formed integrally with a housing or fixed to the housing.

The control member may regulate the positioning arms, or may directly regulate the positioning members. When the cartridge or the single disk is inserted, the control member may be unlocked by pressing force in insertion, and a mechanism for unlocking the control member and the moving member may be completely independently arranged.

In the present invention, the positioning members can be made to be moved from standby positions where the cartridge or the single disk is not prevented from being inserted. When the cartridge is inserted, the positioning members are fitted in recessed portions of the cartridge to position the cartridge. When the single disk is inserted, a disk is positioned by the positioning members at positions where the disk can be driven. When the single disk is used, the positioning members are preferably limited by a stopper to a position where the single disk can be positioned. In this manner, when the positioning member is positioned, the single disk can be reliably positioned.

When the disk is clamped on the turntable after the single disk is positioned by the positioning members, the periphery of the disk can be separated from the positioning members by the centering function of the clamp, so that a sliding force can be prevented from acting on the peripheral portion of the disk.

DESCRIPTION OF THE PREFERRED EMBODIMENT

Figure 1:
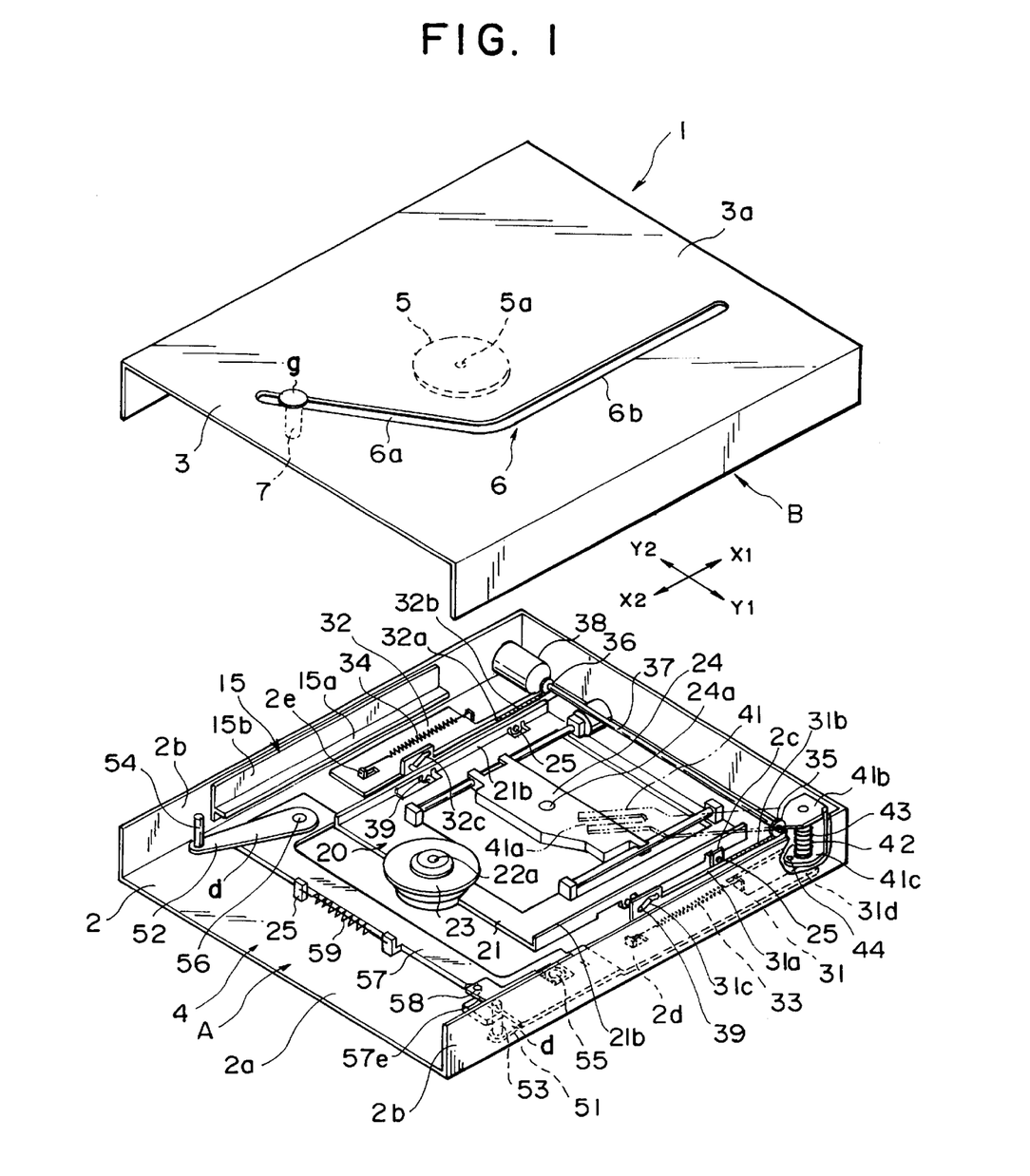
FIG. 1 is an exploded perspective view showing a disk device according to the present invention.
Figure 2A:
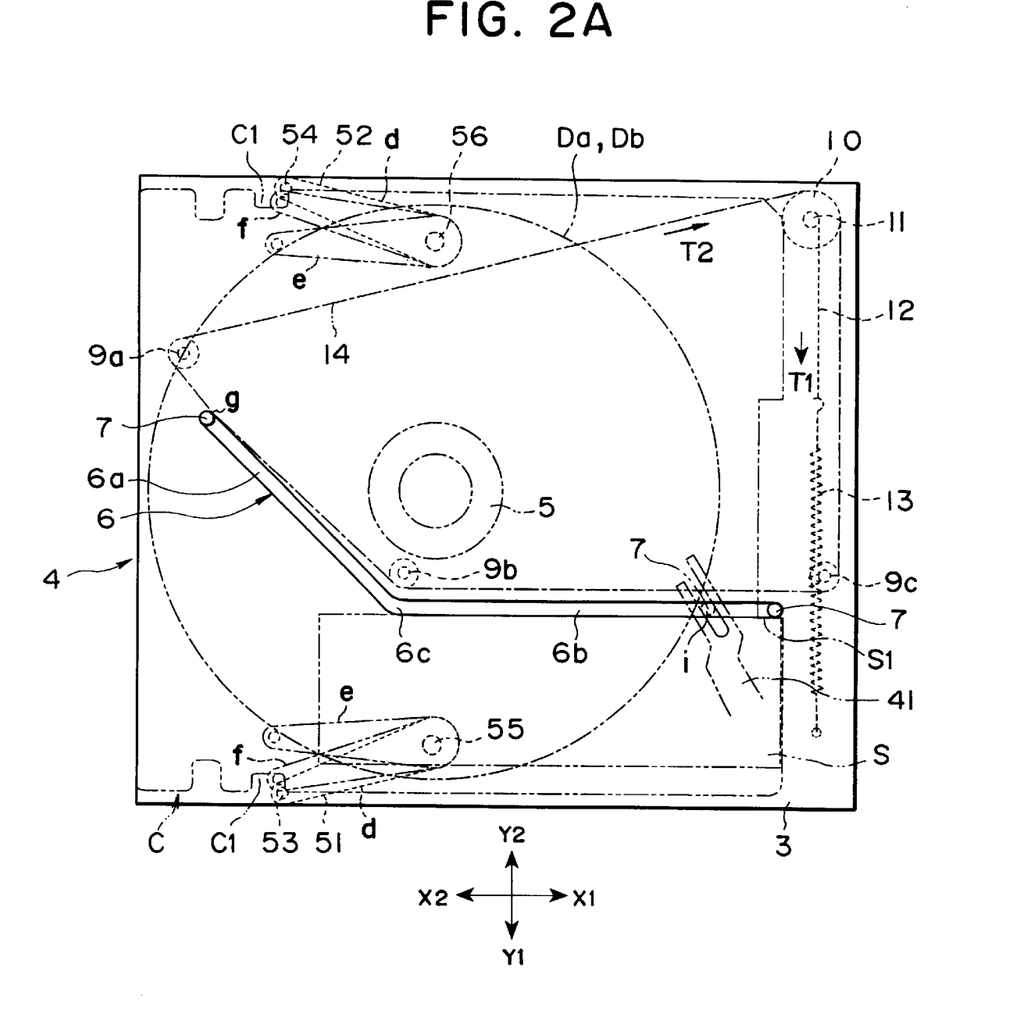
FIG. 2A is a plan view mainly showing the upper-half portion of the disk device.
Figure 2B:
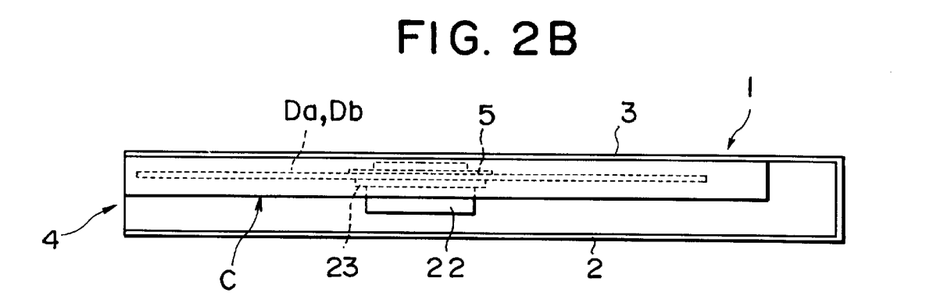
FIG. 2B is a side view showing the disk device.
Figure 3A:
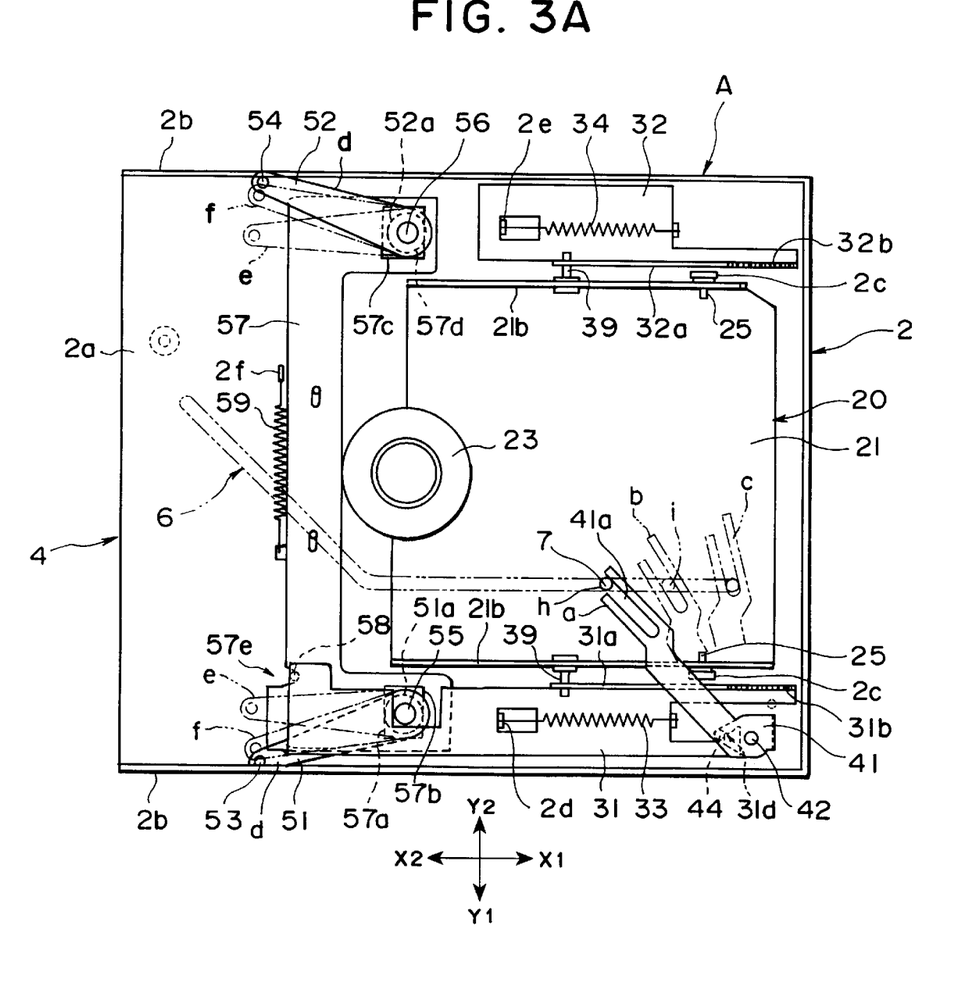
FIG. 3A is a plan view mainly showing the lower-half portion of the disk device.
Figure 3B:
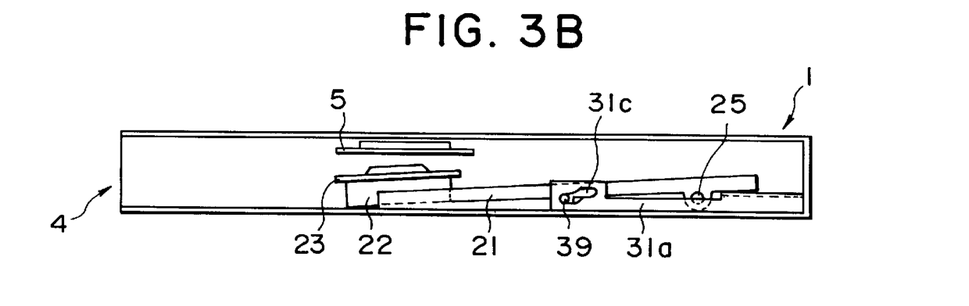
FIG. 3B is a side view showing the disk device.
Figure 4A:
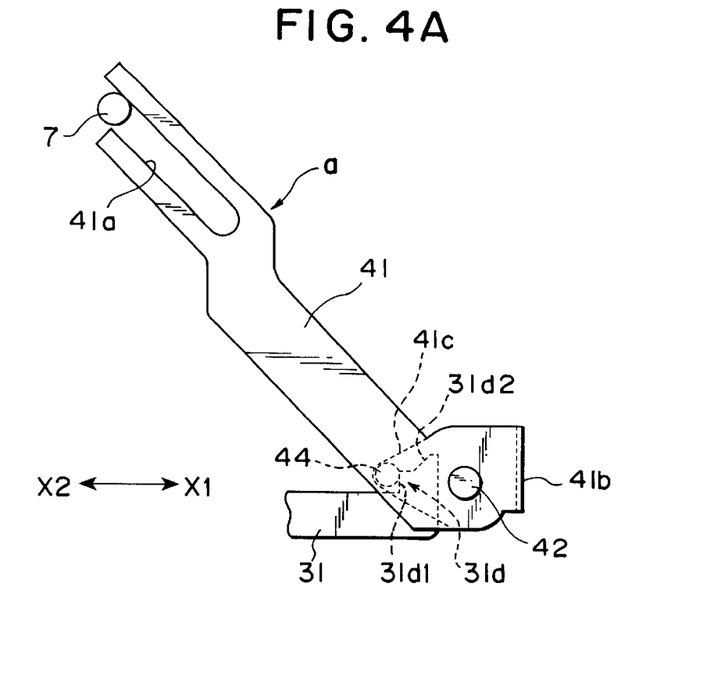
FIGS. 4A and 4B are plan views partially showing pivotal operations of an unlocking member depending on pivotal angles.
Figure 4B:
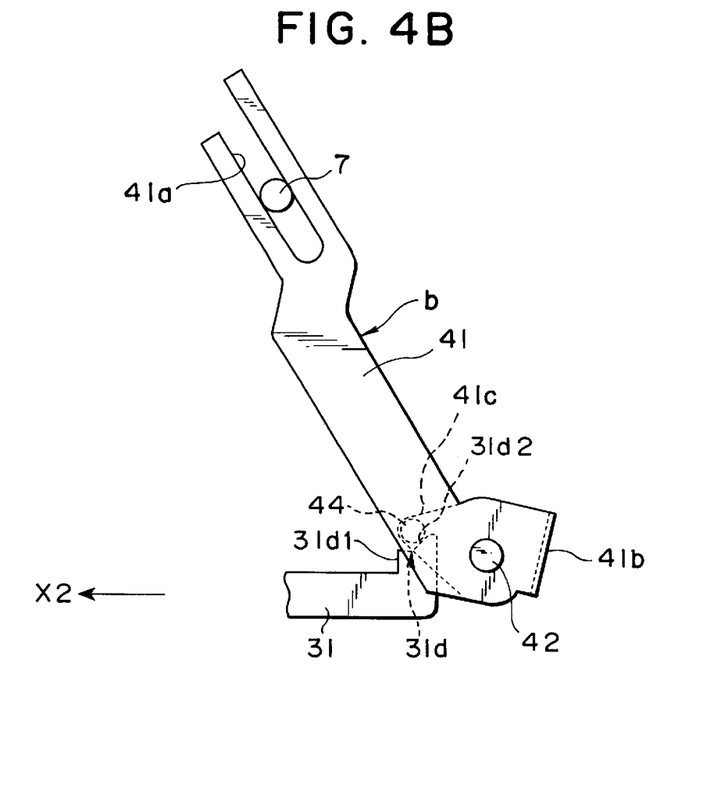
Figure 5:
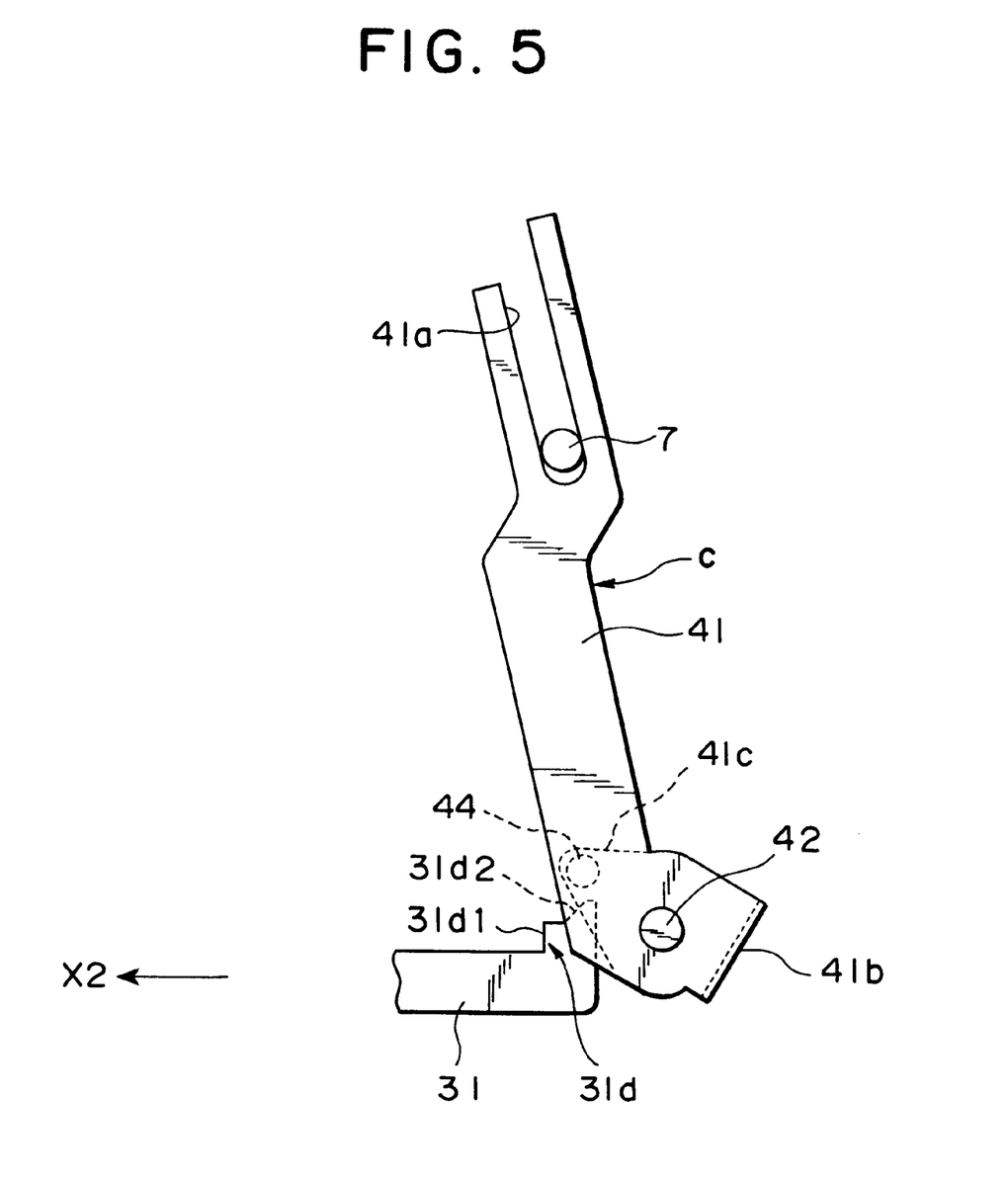
FIG. 5 is a plan view partially showing a state wherein the unlocking member is maximally pivoted in the clockwise direction.
Figure 6A:
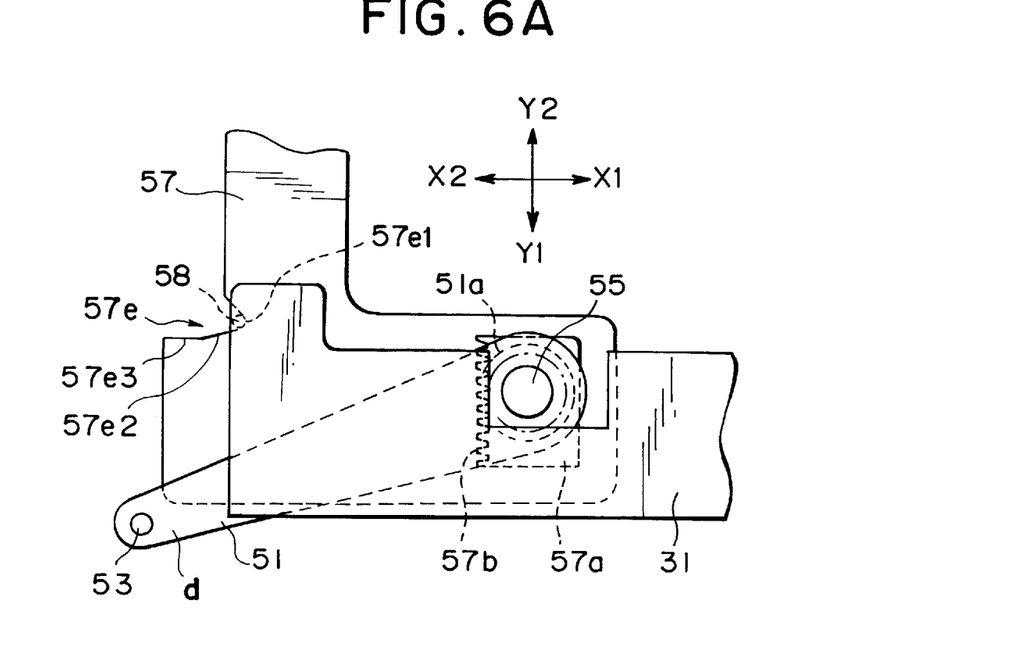
FIGS. 6A and 6B are plan views partially showing states, wherein a positioning arm is driven by a control member, depending on operation states.
Figure 6B:
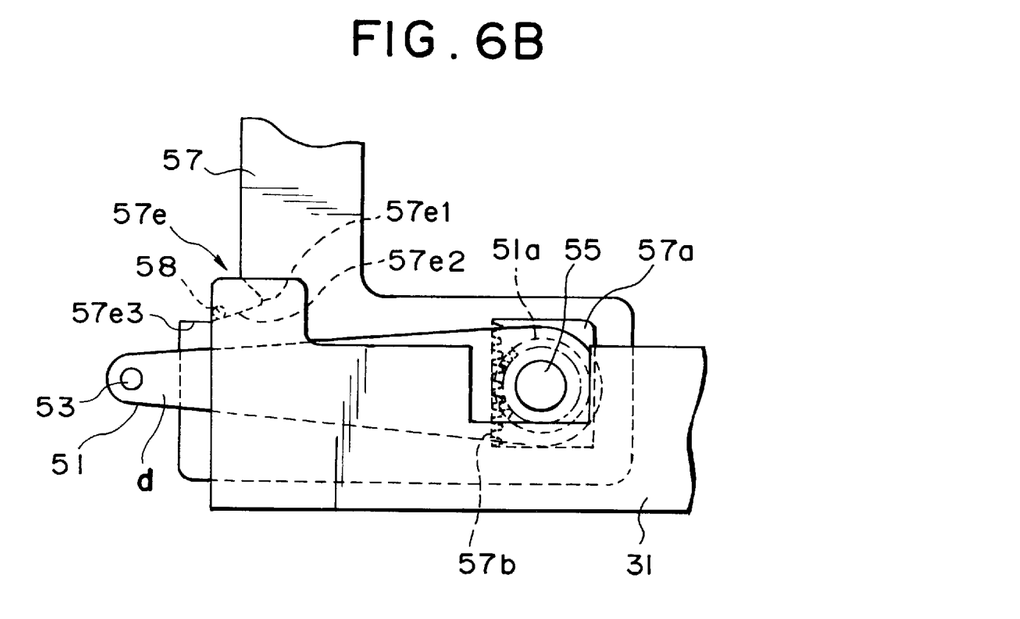

FIG. 1 is an exploded perspective view showing the structure of a disk device according to the present invention; FIG. 2A is a plan view mainly showing the structure of an upper-half portion B of the disk device; FIG. 2B is a side view showing the disk device; FIG. 3A is a plan view mainly showing the structure of a lower-half portion A of the disk device; FIG. 3B is a side view showing the disk device; and FIGS. 4 to 6 are views for explaining partial operations.

On this disk device, both of a cartridge C in which a disk Da shown in FIG. 7A is accommodated and a single disk Db which is not accommodated in a cartridge as shown in FIG. 7B can be loaded. As the disk Da accommodated in the cartridge C and the single disk Db, for example, a power disk (PD), a digital video disk (DVD), a CD-ROM, and the like are used.

As shown in FIG. 1, this disk device is constituted by an upper-half portion A and a lower-half portion B. The disk device obtained by combining the upper-half portion A and the lower-half portion B has a small thickness as shown in FIGS. 2B and 3B.

A housing 1 of the disk device is divided into a lower housing 2 of the upper-half portion A and an upper housing 3 of the lower-half portion B. When the lower housing 2 and the upper housing 3 are combined to each other, the thin-box-shaped housing 1 shown in FIGS. 2B and 3B is obtained, and an insertion port 4 is opened on the left side in FIGS. 2B and 3B. The cartridge C shown in FIG. 7A or the single disk Db shown in FIG. 7B are inserted from the insertion port 4 into the housing 1 in X1 direction.

As shown in FIG. 1, on a ceiling plate 3a of the upper housing 3, a clamper 5 is rotatably supported by a shaft 5a, and the shaft 5a and the clamper 5 are elastically pressed by a leaf spring (not shown) toward the lower housing 2.

A guide 6 is formed in the ceiling plate 3a of the upper housing 3 of the lower-half portion B. The guide 6 has a slot-like shape, and has, on the insertion port 4 side, an oblique guide portion 6a extending X1 direction serving as an insertion direction of the cartridge C or the like and obliquely extending in Y1 direction perpendicular to the insertion direction and a linear guide portion 6b connected to the oblique guide portion 6a and extending parallel to X1 direction. A pin-like moving member 7 serving as an opening/extraction member is inserted into the guide 6, and the moving member 7 is inserted into the slot of the guide 6 such that the moving member 7 can freely move.

As shown in FIG. 2A, small pulleys 9a, 9b, and 9c are rotatably supported on the lower surface of the ceiling plate 3a of the upper housing 3, and a biasing pulley 10 is rotatably supported on an end portion of the upper housing 3 in X1 direction and the corner portion of the end portion in Y2 direction. A wire 14 is hooked on the small pulleys 9a, 9b, and 9c, and the wire 14 is wound on the biasing pulley 10, so that the circular movement of the wire 14 follows the rotation of the biasing pulley 10. The moving member 7 is fixed to one portion of the wire 14.

A small-diameter pulley 11 is integrally formed on the biasing pulley 10. One end of a biasing wire 12 is fixed to the small-diameter pulley 11, and the biasing wire 12 is wound on the small-diameter pulley 11. An extraction spring 13 serving as a biasing member is hooked between the other end of the biasing wire 12 and the upper housing 3. The biasing wire 12 is drawn by the contraction force of the extraction spring 13 to bias the small-diameter pulley 11 and the biasing pulley 10 integrated therewith in the clockwise direction. For this reason, the wire 14 is biased to circularly move in the clockwise direction, and the moving member 7 fixed to the wire 14 pressed on the end portion of the guide 6 on the insertion port 4 side.

Clockwise biasing torque obtained by the tensile elastic force of the extraction spring 13 is given to the small-diameter pulley 11, and the wire 14 is wound on the large-diameter biasing pulley 10. For this reason, the movement distance of the moving member 7 along the guide 6 is long because of the difference between the biasing pulley 10 and the small-diameter pulley 11 in diameter, but the extension/contraction size of the extraction spring 13 is shortened. Therefore, the extraction spring 13 shorter than the movement distance of the moving member 7 can be used, and, as shown in FIG. 2A, the extraction spring 13 can be arranged to extend in the direction (Y direction) of width of the upper housing 3. In addition, since a tensile force T2 given to the wire 14 by the biasing pulley 10 is smaller than a tensile force T1 given to the biasing wire 12 by the extraction spring 13, the cartridge C or the single disk Db are inserted from the insertion port 4. When the moving member 7 is pressed by the cartridge C or the single disk Db in X1 direction, a resisting force given from the moving member 7 to the cartridge C or the single disk Db decreases. Therefore, the cartridge C or the single disk Db can be pressed into the insertion port 4 or the housing 1 with light force.

As shown in FIG. 1, a guide member 15 is fixed on the inner side of each of both side plates 2b of the lower housing 2 constituting the upper-half portion A. In FIG. 1, only the guide member 15 fixed on one side plate 2b is illustrated. This guide member 15 consists of a synthetic resin material having a small friction coefficient. In this guide member 15, a lower guide wall 15a for supporting the lower surface of the cartridge C or the single disk Db and a side guide wall 15b for guiding the side portion of the cartridge C or the single disk Db are integrated with each other. The lower guide wall 15a is located at the middle of the side plate 2b of the lower housing 2 in the direction of height. As shown in FIG. 2B, the cartridge C or the single disk Db inserted from the insertion port 4 is guided to an upper area in the housing 1 by the guide member 15.

As shown in FIG. 1, a unit chassis 21 of a disk drive unit 20 is arranged on a bottom plate 2a of the lower housing 2. As shown in FIG. 3B, the unit chassis 21 is constituted by a sheet metal which is bent into a U shape. A thin spindle motor 22, as shown in FIG. 3B, is fixed to the end portion of the unit chassis 21 on the insertion port 4 side, and a turntable 23 is fixed to a rotating shaft 22a of the spindle motor 22. The clamper 5 arranged under the ceiling plate 3a of the upper housing 3 is located immediately above the turntable 23. An optical head 24 is supported on the unit chassis 21 such that the optical head 24 can move in X1–X2 direction, and an objective lens 24a is arranged on the optical head 24. A sled motor (not shown) for moving the optical head 24 in X1–X2 direction is arranged on the unit chassis 21.

A support shaft 25 is inserted on the device inner side (X1 side) of the side plates 21b of the unit chassis 21. A support piece 2c is shaped by notching the bottom plate 2a of the lower housing 2, and the support shaft 25 is fixed to the support piece 2c. Therefore, the unit chassis 21 of the disk drive unit 20 is freely pivoted about the support shaft 25 arranged on the device inner side.

A pair of plate-like control members 31 and 32 are arranged on the bottom plate 2a of the lower housing 2, and the control members 31 and 32 are supported slidably in X1–X2 direction. A coil spring 33 is hooked, as a biasing member, between one control member 31 and a spring hook 2d formed by notching the bottom plate 2a of the lower housing 2. Similarly, a coil spring 34 serving as a biasing member is hooked between the other control member 32 and a spring hook 2e formed by notching the bottom plate 2a of the lower housing 2, so that the control member 32 is biased in X2 direction.

A bent piece 31a which vertical stands is integrally formed on one control member 31, and a rack 31b is formed on the edge portion of the bent piece 31a in X1 side.

Similarly, a bent piece 32a which vertical stands is formed on the control member 32, and a rack 32b is formed on the end portion of the upper edge of the bent piece 32a on X1 side.

As shown in FIG. 1, a shaft 37 extending in Y direction is rotatably supported on the end portion in the lower housing 2 on X1 side. Although he shaft 37 is supported by the lower housing 2, the support mechanism for the shaft 37 is omitted in FIG. 1. A gear 35 is fixed to one end of the shaft 37, and a gear 36 is fixed to the other end of the shaft 37. The gear 35 is meshed with the rack 31b of the control member 31, and the gear 36 is meshed with the rack 32b of the control members 31 and 32. The pair of control members 31 and 32 are connected to each other through the gears 35 and 36 and the shaft 37, and the control members 31 and 32 synchronously move in X1–X2 direction together with each other.

A restoring motor 38 is arranged on the inner side of the lower housing 2 in X1 direction, and a gear attached to the output shaft of the restoring motor 38 is meshed with the gear 36. When the restoring motor 38 is not energized, the pair of control members 31 and 32 can be moved in X2 direction by the elastic force of the coil springs 33 and 34 regardless of a load on the restoring motor 38. When the restoring motor 38 is energized, the gears 36 and 35 are driven to transmit movement force to the racks 31b and 32b, so that the respective control members 31 and 32 are drawn in X1 direction.

As shown in FIGS. 1 and 3B, a clank-shaped drive hole 31c serving as a drive portion for moving the disk drive unit 20 in the clamp direction is formed in the bent piece 31a of the control member 31, and similarly, a clank-shaped drive hole 32c serving as a drive portion is formed in the bent piece 32a of the control members 31 and 32. Pins 39 are fixed to both the side plates 21b of the unit chassis 21, and the pins 39 are inserted into the drive holes 31c and 32c, respectively. As shown in FIGS. 1 and 3B, when the control members 31 and 32 moves in X1 direction, the pins 39 are moved downward by the drive holes 31c and 32c, the unit chassis 21 is pivoted downward about the support shafts 25, and the turntable 23 is located under the insertion guide area of the cartridge C or the single disk Db. When the control members 31 and 32 move in X2 direction, the pins 39 are lifted up by the clank-shaped drive holes 31c and 32c. As shown in FIG. 2B, the unit chassis 21 is pivoted upward, the disk can be sandwiched by the turntable 23 and the clamper 5.

An unlocking member (unlocking arm) 41 is arranged at the corner portion of the lower housing 2 on X1 side and Y1 side. The proximal end portion of the unlocking member 41 is pivotally supported by the support shaft 42. A lock spring 43, which is a torsion spring, is arranged on the outer periphery of the support shaft 42. The lock spring 43 biases the unlocking member 41 in the counterclockwise direction (direction indicated by a solid line 1 in FIG. 3A) on the plan view shown in FIG. 3A.

A fitting groove 41a is formed in the distal end portion of the unlocking member 41, and, as shown in FIG. 3A, when the moving member 7 slid on the guide 6 moves in the direction of depth of the device, the moving member 7 can be fitted in the fitting groove 41a.

As shown in FIG. 1, a bent portion 41b which is bent toward the bottom plate 2a is formed on the proximal end portion of the unlocking member 41, and the lower end of the bent portion 41b forms a lock portion 41c bent in a direction parallel to the bottom plate 2a. A lock pin 44 serving as a lock member extending toward the bottom plate 2a is foxed to the distal end of the lock portion 41c.

As shown in FIGS. 4A, 4B and 5, an engagement portion 31d is formed on the end portion of the control member 31 on X1 side. The engagement portion 31d constituted by a first engagement portion 31d1 and a second engagement portion 31d2. The second engagement portion 31d2 is an oblique line.

When the unlocking member 41 is pivoted to have posture 1 indicated by a solid line in FIG. 3A, as shown in FIG. 4A, the lock pin 44 is engaged with the first engagement portion 31d1, and the control member 31 is locked at a position where the control member 31 moves on X1 side. When the cartridge C or the single disk Db is inserted from the insertion port 4, and the moving member 7 is pressed on the device inner side (X1 direction) by the cartridge C and the single disk Db, the moving member 7 begins to be inserted in the fitting groove 41a of the unlocking member 41 having posture 1. When the moving member 7 is further pressed on the device inner side (X1 direction), the unlocking member 41 is pivoted clockwise by the moving member 7. When the unlocking member 41 is pivoted to the position indicated by b shown in FIG. 3A, as shown in FIG. 4B, the lock pin 44 is engaged with the second engagement portion 31d2. Thereafter, the control member 31 is moved in X2 direction by the elastic force of the coil spring 33, the lock pin 44 is guided by the second engagement portion 31d2 which is inclined, and the unlocking member 41 is slightly more pivoted clockwise from the position indicated by b.

When the single disk Db is inserted, the unlocking member 41 is pivoted to the position indicated by b, and the single disk Db is slightly more pivoted clockwise from the position indicated by b as described above. However, when the cartridge C is inserted, the moving member 7 is pressed to the end of the guide 6 on X1 side, and the unlocking member 41 is pivoted to a position indicated by c. FIG. 5 shows a state wherein the unlocking member 41 is pivoted to the position indicated by c.

On the insertion port 4 side of the lower housing 2, a pair of arms 51 and 52 are arranged on both the side portions in Y1 and Y2 directions. Positioning pins (positioning members) 53 and 54 extending upward are fixed to the distal end portion of the positioning arms 51 and 52, respectively. The proximal end portions of the arms 51 and 52 are pivotally supported by support shafts 55 and 56 fixed to the bottom plate 2a of the lower housing 2.

An interlocking lever 57 extending in Y1–Y2 direction and supported slidably in Y1–Y2 direction is arranged between the positioning arms 51 and 52. An interlocking spring 59 is arranged between the interlocking lever 57 and a support piece 2f formed by notching the bottom plate 2a, and the interlocking lever 57 is biased in Y2 direction by the interlocking spring 59.

As shown in FIG. 3A, a square hole 57a is formed in the end portion of the interlocking lever 57 on Y1 side, and the support shaft 55 for supporting the proximal end of the positioning arm 51 is located in the square hole 57a. A rack 57b is formed on the edge portion of the square hole 57a on Y2 side, and a gear 51a integrally fixed to the proximal end of the positioning arm 51 and around the support shaft 55 is meshed with the rack 57b. A square hole 57c is formed in the end portion of the interlocking lever 57 on Y2 side, the support shaft 56 for supporting the proximal end portion of the positioning arm 52 is located in the square hole 57c. In the square hole 57c, a rack 57d is formed on the edge portion on X1 side opposing the side in the square hole 57a. A gear 52a using the support shaft 56 as a center is integrally fixed to the proximal portion of the positioning arm 52, and the gear 52a is meshed with the rack 57d.

When the interlocking lever 57 moves in Y1 direction, the meshing operation between the rack 57b and the gear 51a and the meshing operation between the rack 57d and the gear 52a cause the positioning arm 51 to pivot counterclockwise and cause the positioning arm 52 to pivot clockwise, and the positioning members 53 and 54 are separated from each other. When the interlocking lever 57 moves in Y2 direction, the positioning arm 51 pivots clockwise, and the positioning arm 52 pivots counterclockwise. In this case, the positioning members 53 and 54 become close to each other.

As shown in FIGS. 6A and 6B, a regulation portion 57e is formed on the edge portion of the interlocking lever 57 on Y1 side. The regulation portion 57e is constituted by a V-shaped depression portion 57e1, an oblique portion 57e2, and a linear stopper 57e3 extending in X1–X2 direction. A regulation pin 58 extending toward the bottom plate 2a is arranged on the end portion of the control member 31 on X2 side, so that the regulation pin 58 can be engaged with the regulation portion 57e.

FIG. 6A shows a state wherein the control member 31 maximally moves in X1 direction. In this state, the regulation pin 58 is fitted in the depression portion 57e1 of the regulation portion 57e, and the interlocking lever 57 moves in Y1 direction to be held in this state. The pivotal positions of the positioning arms 51 and 52 at this time are indicated by d. When the positioning arms 51 and 52 are set at the position indicated by d, the positioning arms 51 and 52 are set at standby positions. At this time, the positioning members 53 and 54 serving as positioning members are refuged to the side of the insertion path of the cartridge C or the single disk Db, so that the cartridge C or the like is not prevented from being inserted. When the control member 31 moves in X2 direction, as shown in FIG. 6B, the regulation pin 58 slides on the oblique portion 57e2 to reach the boundary point between the oblique portion 57e2 and the linear stopper 57e3. At this time, the interlocking lever 57 moves in Y2 direction by the biasing force of the interlocking spring 59. At this time, the pivotal positions of the positioning arms 51 and 52 are indicated by e. When the control member 31 more moves from the position shown in FIG. 6B in X2 direction, the regulation pin 58 slides on the linear stopper 57e3, and the position of the interlocking lever 57 and the pivotal postures of the positioning arms 51 and 52 are kept at the position and postures shown in FIG. 6B.

An operation of the disk device described above will be described below.

Both a cartridge C in which a disk Da shown in FIG. 7A is accommodated and a single disk Db shown in FIG. 7B can be loaded on the disk device. The disks Da and Db have the same diameter and central holes D1 having the same inner diameter.

In the cartridge C shown in FIG. 7A, a shutter S which can slide in Y1 direction is formed on the end portion of the cartridge C in X1 direction, i.e., an insertion direction. The shutter S is biased in a closing direction (Y2 direction) by a spring. When the shutter S is slid in Y1 direction, a window opens in the cartridge C, and the central hole D1 of the disk D and a disk surface thereof appears from the window.

(Standby State) In a standby state, the moving member 7 arranged on the upper housing 3 is located at a position indicated by g, i.e., at the end portion of the guide 6 on X2 side. A biasing force in X2 direction is given to the moving member 7 by the elastic force of the extraction spring 13.

The control members 31 and 32 are connected to each other through the gears 35 and 36 and the shaft 37 and synchronously operated. However, in an initial state, both the control members 31 and 32 move in X1 direction. The unlocking member 41 is biased in the counterclockwise direction and pivoted to have a posture indicated by a. As shown in FIG. 4A, the lock pin 44 arranged on the proximal end portion of the unlocking member 41 is engaged with the first engagement portion 31d1 of the engagement portion 31d formed on the control member 31, and the control member 31 is locked at a position where the control member 31 moves in X1 direction.

At this time, as shown in FIG. 6A, the regulation pin 58 arranged on the end portion of the control member 31 on X2 side is fitted in the depression portion 57e1 of the regulation portion 57e formed on the interlocking lever 57, and the interlocking lever 57 is held at a position where the interlocking lever 57 is drawn in Y1 direction against the tensile force of the interlocking spring 59. For this reason, the positioning arm 51 is pivoted counterclockwise by the rack 57b arranged on the interlocking lever 57 on Y1 side, and the positioning arm 52 is pivoted clockwise by the rack 57d arranged on the interlocking lever 57 on Y2 side. Both the positioning arms 51 and 52 are located at the position indicated by d, and the positioning members 53 and 54 are separated from each other. For this reason, the positioning members 53 and 54 do not prevent the disk Db or the cartridge C from being inserted.

In this disk device, the disk Db or the cartridge C is inserted from the insertion port 4 in X1 direction. However, in this insertion, the restoring motor 38 is not energized. That is, the disk device uses a manual slot-in method in which the disk Db or the cartridge C is manually pressed into the device.

(Loading Operation of Disk Db)

An operation of inserting a single disk Db will be described below.

The disk Db is inserted from the insertion port 4 into the housing 1 and then guided onto the lower guide walls 15a of the guide members 15 arranged on both the side plates 2b of the lower housing 2.

When the disk Db is inserted from the insertion port 4, the distal end portion of the disk Db is brought into contact with the moving member 7 located at the position indicated by g. When the disk Db is more pressed with a hand, the moving member 7 is pressed by the edge portion of the disk Db in X1 direction, and the moving member 7 slides on the guide 6 according to the insertion of the disk Db to move in X1 direction. Meanwhile, the wire 14 circularly moves in the counterclockwise direction to cause the biasing pulley 10 to rotate in the counterclockwise direction, and the biasing wire 12 is wound by the small-diameter pulley 11 integrally formed on the biasing pulley 10, so that the extraction spring 13 extends.

When the moving member 7 is pressed, to the position indicated by h in FIG. 3A, by the edge portion of the disk Db in X1 direction, the moving member 7 begins to be inserted in the fitting groove 41a of the unlocking member 41 located at the position indicated by a. In this state, while the disk Db is pressed into the housing to move the member 7 to the position indicated by i, a centering operation of the disk Db and a disk clamping operation are continuously performed.

When the moving member 7 is pressed from the position indicated by h in X1 direction, the unlocking member 41 having the fitting groove 41a in which the moving member 7 is fitted is pivoted clockwise by force for pressing the disk Db. When the moving member 7 reaches the position indicated by i, the unlocking member 41 is pivoted to the position indicated by b. At this time, as shown in FIGS. 4A to 4B which show these processes, the lock pin 44 arranged on the proximal portion of the unlocking member 41 is disengaged from the first engagement portion 31d1 of the engagement portion 31d of the control member 31 to reach the second engagement portion 31d2. Therefore, the control member 31 is drawn by the coil spring 33 to move in X2 direction by a short distance. At this time, since the restoring motor 38 is not energized, load on the gears 35 and 36 is light. For this reason, in movement of the control member 31 in X2 direction, the gear 35 is driven by the rack 31b, and the control member 32 also moves in X2 direction by the biasing force of the coil spring 34 together with the control member 31.

When the control member 31 moves from the position in FIG. 4A to the position in FIG. 4B by a short distance, as shown in FIGS. 6A and 6B, the regulation pin 58 fixed to the end portion of the control member 31 on X2 side removed from the depression portion 57e1 of the regulation portion 57e. Therefore, the interlocking lever 57 is drawn by the interlocking spring 59 to move in Y2 direction. The position of the control member 31 when the unlocking member 41 pivots to the position indicated by b in FIG. 4B is the same as the position shown in FIG. 6B.

In FIG. 6B, the regulation pin 58 is located at the boundary between the oblique portion 57e2 of the regulation portion 57e and the linear stopper 57e3. While the state shown in FIG. 6A changes into the state shown in FIG. 6B, the interlocking lever 57 is drawn in Y2 direction by the interlocking spring 59. For this reason, the positioning arm 51 is pivoted clockwise by the rack 57b, and the positioning arm 52 is pivoted counterclockwise by the rack 57d, so that the positioning arms 51 and 52 move from the position indicated by d to the position indicated by e.

When both the positioning arms 51 and 52 pivot in the direction indicated by e, the disk Db is drawn in X1 direction by force generating when the positioning pins 53 and 54 respectively fixed to the positioning arms 51 and 52 become close to each other. As shown in FIG. 2A, the disk Db is centered by three points, i.e., the positioning members 53 and 54 at the position indicated by e and the moving member 7 at the position indicated by i, and the central hole D1 of the disk Db almost coincides with the centers of the turntable 23 and the clamper 5.

Immediately before the centering of the disk is completed, the pins 39 are lifted up depending on the clank shape of the drive hole 31c of the control member 31 and the clank shape of the drive hole 32c of the control member 32, and the unit chassis 21 is pivoted upward by using the support shafts 25 as fulcrums. The moment the centering of the disk Db is completed or immediately after the centering is completed, the central hole D1 of the disk Db is sandwiched by the turntable 23 and the clamper 5.

As described above, while the states shown in FIGS. 4A and 6A change into the states shown in FIGS. 4B and 6B, the disk Db is centered by the positioning members 53 and 54 and the moving member 7, and clamping of the disk Db is completed by the turntable 23 and the clamper 5. However, in the state shown in FIG. 4B wherein the centering and the clamping are completed, the control member 31 more moves in X2 direction by the tensile force of the coil spring 33 by a short distance. At this time, the inclined second regulation portion 31d2 of the engagement portion 31d shown in FIG. 4B slightly pivots the unlocking member 41 in the clockwise direction from the position indicated by b. Therefore, the moving member 7 held by the fitting groove 41a of the unlocking member 41 slightly moves in X1 direction, and the moving member 7 is separated from the clamped disk Db.

While the control member 31 slightly moves from the position shown in FIG. 4B in X2 direction, as shown in FIG. 6B, the regulation pin 58 fixed to the control member 31 slides on the stopper 57e3 of the regulation portion 57e. Therefore, the position of the interlocking lever 57 is the same as that shown in FIG. 6B. For this reason, the positioning arms 51 and 52 are kept at the position indicated by e. Although the disk Db is clamped in reception of centering force generated when the turntable 23 moves upward, the center of the disk Db and the center of the turntable 23 coincide with each other by using the centering function in this clamping operation, and the peripheral portion of the centered disk Db is slightly separated from both the positioning members 53 and 54 and the moving member 7. For this reason, the disk Db is not brought into contact with the positioning members 53 and 54, and is rotatably driven by the spindle motor 22 without being brought into contact with the moving member 7. Signals recorded on the disk Db are read by the optical head 24.

(Loading Operation for Cartridge C)

An operation performed when the cartridge C shown in FIG. 7A is inserted will be described below.

Immediately after the cartridge C is inserted into the insertion port 4, the moving member 7 located at the position indicated by g in FIG. 2A is fitted in an end portion S1 of the shutter S. When the cartridge C is continuously inserted with the force of a hand, the moving member 7 is pressed to move along the guide 6. When the moving member 7 moves on the oblique guide portion 6a of the guide 6, the shutter S is slid in Y1 direction by force corresponding to the movement of the moving member 7 in Y1 direction. When the moving member 7 reaches an inflection point 6c between the oblique guide portion 6a and the linear guide portion 6b of the guide 6, the shutter S is completely opened. Thereafter, when the cartridge C is pressed into the housing, the moving member 7 slides on the linear guide portion 6b of the guide 6 in X1 direction.

When the moving member 7 moving on the linear guide portion 6b moves to the position indicated by h in FIG. 3A, the moving member 7 is fitted in the fitting groove 41a of the unlocking member 41 located at the position indicated by a. With the movement of the moving member 7 in X1 direction, the unlocking member 41 pivots clockwise. When the cartridge C is completely inserted into the housing 1, the moving member 7 moves the end of the guide 6 on X1 side, and the unlocking member 41 pivots to the position indicated by c.

When the unlocking member 41 pivots from the position indicated by a to the position indicated by c with insertion of the cartridge C, as shown in FIGS. 4A to 5 showing these processes, the lock pin 44 arranged at the proximal portion of the unlocking member 41 is disengaged from the first engagement portion 31d1 and the second engagement portion 31d2 of the engagement portion 31d of the control member 31. Therefore, the unlocked control member 31 moves in X2 direction by the elastic force of the coil spring 33, and the control member 32 synchronized with the control member 31 through the gears 35 and 36 and the shaft 37 also moves in X2 direction by the elastic force of the coil spring 34.

When the control members 31 and 32 move in X2 direction, the unit chassis 21 is lifted up by the clank-shaped drive holes 31c and 32c formed in the control members 31 and 32, and the central hole D1 of the disk Da in the cartridge C can be sandwiched by the turntable 23 and the clamper 5.

When the control member 31 moves in X2 direction, the regulation pin 58 arranged on the end portion of the control member 31 on X2 side is removed from the depression portion 57e1 of the regulation portion 57e of the interlocking lever 57, and the interlocking lever 57 moves in Y2 direction by the biasing force of the interlocking spring 59. Therefore, the positioning arm 51 is pivoted clockwise by the rack 57b arranged on the interlocking lever 57, and the positioning arm 52 is pivoted counterclockwise by the rack 57d, so that the positioning members 53 and 54 are brought into contact with both the side portions of the cartridge C. The positioning members 53 and 54 at this time is elastically pressed on the cartridge C by the elastic force of the interlocking spring 59.

When the cartridge C is completely inserted into the housing 1 as shown in FIG. 2A, the positioning arms 51 and 52 pivot to the position indicated by f, and the positioning members 53 and 54 are fitted in recessed portions C1 of both the side portions of the cartridge C. In this manner, the cartridge C is positioned to be held at this position.

As described above, when the cartridge C is positioned and held, the shutter S has been opened by the moving member 7, and the central hole D1 of the disk Da exposed by opening the shutter S is clamped by the turntable 23 and the clamper 5. A reproducing operation is performed by the optical head 24.

(Extraction Operation)

In this disk device, although the disk Db or the cartridge C are manually inserted as described above, an extraction operation is performed by the drive force of the restoring motor 38.

When an extraction operation button (not shown) is pressed, the restoring motor 38 is energized, and the gears 35 and 36 are started by the rotating output of the restoring motor 38. The rotating force is transmitted to the racks 31b and 32b, and the control members 31 and 32 are driven in X1 direction.

When the control member 31 is driven in X1 direction, the regulation pin 58 arranged on the end portion of the control member 31 on X2 side slides in X1 direction on the oblique portion 57e2 of the regulation portion 57e shown in FIG. 6A to cause the interlocking lever 57 to return in Y1 direction, and the regulation pin 58 is fitted in the depression portion 57e1 to hold the interlocking lever 57.

When the interlocking lever 57 moves in Y1 direction, the positioning arm 51 pivots counterclockwise, and the positioning arm 52 pivots clockwise. The positioning members 53 and 54 are separated from the disk Db or the cartridge C, and the disk Db or the cartridge C are released from positioning and holding. The unit chassis 21 is moved downward by the drive holes 31c and 32c, and the disk is released from clamping performed by the turntable 23 and the clamper 5.

Therefore, the disk Db or the cartridge C is pushed out of the insertion port 4 by the biasing force of the moving member 7 in X2 direction generated by the tensile elastic force of the extraction spring 13 shown in FIG. 2A. While the moving member 7 moves from the end in X1 direction to the position indicated by h, the control member 31 returns in X1 direction. As shown in FIG. 4A, the lock pin 44 of the proximal portion of the unlocking member 41 pivoting to the position indicated by a is fitted in the first engagement portion 31d1, and the control member 31 is locked at an initial position where the control member 31 moves in X1 direction. At this time, the restoring motor 38 is stopped.

In use of the cartridge C, when the cartridge C is extracted from the insertion port 4, the moving member 7 returns to the position indicated by g, the shutter S is closed accordingly.

As has been described above, according to the present invention, both a cartridge and a single disk which is not accommodated in a cartridge can be loaded. In addition, since both a cartridge and a single disk can be positioned by using a common positioning member, a simple mechanism can be obtained.

In particular, when a positioning member is biased by a biasing member to unlock a control member for determining the position of the positioning member, thereby moving the positioning member in a positioning direction. In this case, the cartridge and the single disk can be positioned by the positioning member which receives the biasing force of the biasing member. A simple mechanism can also be obtained.

What is claimed is:

1. A disk device comprising:

an insertion port formed in a housing of the disk device so as to receive either a cartridge accommodating a disk having an openable/closable shutter, wherein said disk is exposed by opening said shutter, or a single disk which is not accommodated in a cartridge;

a moving member operated in response to insertion of said cartridge or said single disk, wherein said moving member is disposed at an initial location where it can be fitted in a recessed portion formed on a side edge of said shutter when said cartridge is inserted and where it is brought into contact with a peripheral edge of an advancing side of said single disk when said single disk is inserted;

a slot-shaped guide formed in said housing of the disk device, said slot-shaped guide engaging with and supporting said moving member so that said moving member can be moved therein and guided in a direction in which said cartridge or said single disk is inserted or extracted, said slot-shaped guide comprising an oblique guide portion and a linear guide portion, said oblique guide portion configured so as to guide said moving member in an open direction of said shutter when said moving member has been fitted in said recessed portion of said shutter and said cartridge is inserted into said insertion port, and said linear guide portion extending continuously from said oblique guide portion in an inserting direction, said inserting direction being the direction in which said cartridge or said single disk is inserted into said insertion port;

a plurality of positioning members disposed at standby positions and arranged on both sides of an insertion path, said positioning members disposed so as to not impede the insertion of said cartridge or said single disk into said insertion port, said plurality of positioning members being configured so as to be brought into contact with a side edge of the inserted cartridge or the peripheral edge of the inserted single disk, said plurality of positioning members being formed so as to fit in a recessed portion formed in the side edge of the inserted cartridge;

a guide member for guiding the cartridge or the single disk that has been inserted into the insertion port to a location where the disk accommodated by said cartridge or the single disk can be driven;

a biasing member for applying a biasing force to said plurality of positioning members in a direction in which said plurality of positioning members are brought into contact with said inserted cartridge or said inserted single disk, said biasing member biasing said plurality of positioning members so that said inserted cartridge is guided to a location where said disk accommodated by said inserted cartridge can be driven, and said biasing member biasing said plurality of positioning members so that said inserted single disk is guided to a location where said single disk can be driven;

a control member for regulating said plurality of positioning members so that said plurality of positioning members are disposed at a standby position against the biasing force of said biasing member before insertion of the cartridge or the single disk;

a lock member for operatively locking said control member when said plurality of positioning members are regulated in said standby position;

wherein said locking operation of said lock member is cancelled in response to the movement of said moving member caused by inserting said cartridge or said single disk, whereby said regulation of said plurality of positioning members by said control member is cancelled;

wherein said moving member positions said inserted single disk at a location where it can be driven when said moving member has been positioned at a location where the locking operation of said lock member is released; and a return member for returning said moving member from an inserted location to the initial location when said cartridge or said single disk is extracted from said insertion port.

2. A disk device according to claim 1, further comprising:

a pair of positioning arms, each said positioning arm pivotally supported by said housing of the disk device and including at least one positioning member;

wherein said biasing member applies a biasing force to said positioning arms in a direction in which said positioning members are brought into contact with said inserted cartridge or said inserted single disk; and wherein said control member regulates said positioning arms against the biasing force of said biasing member so that said positioning members are disposed at said standby positions before insertion of the cartridge or the single disk, wherein said regulation of said positioning arms by said control member is cancelled in response to the canceling of the locking operation performed by the lock member subsequent to the insertion of the cartridge or the single disk.

3. A disk device according to claim 2, further comprising a stopper;

said stopper operative for limiting a pivoting operation of said positioning arms when regulation by said control member is canceled;

wherein, when a single disk is inserted, said stopper operative for limiting a pivoting operation of said positioning arms when said positioning arms move in the biasing direction of said biasing member to reach a position where said positioning members can position said inserted single disk; and wherein, when a cartridge is inserted, said positioning members are fitted in said recessed portions before said positioning arms are limited by said stopper.

4. A disk device according to claim 3, wherein after said inserted single disk is positioned by said positioning members, said single disk is centered and clamped on said turntable and subsequently separated from said positioning members, the position of said positioning members limited by said stopper.

5. A disk device according to claim 2, wherein said positioning members are a pair of pins, each said pin being formed on one of said pair of positioning arms, said pins being formed so as to each fit in any one of a plurality of recessed portions formed on both side edges of said inserted cartridge, and said pins being formed so as to be brought into contact with the peripheral edge of said inserted single disk.

6. A disk device according to claim 1, wherein said moving member is a pin fitted in said slot-shaped guide.

7. A disk device according to claim 1, wherein each of said plurality of positioning members is a pin, said pins being formed so as to each fit in any one of a plurality of recessed portions formed on both side edges of said inserted cartridge, and said pins being formed so as to be brought into contact with the peripheral edge of said inserted single disk.

8. A disk device according to claim 1, wherein said lock member comprises an arm pivotally supported by said housing of the disk device and biased by a spring in a direction opposite to the inserting direction of said cartridge or said single disk, said arm having a fitting groove formed therein so to be engaged by said moving member as said moving member is advanced in said inserting direction, and a lock pin connected to said arm, said lock pin being configured to cooperate with said control member so as to cancel the locking operation of said lock member when said moving member has engaged said fitting groove.

9. A disk device according to claim 8, wherein said control member comprises a sheet member biased by a spring in a direction opposite to the inserting direction of said cartridge or said single disk, said sheet member having a first engagement portion formed on an end portion thereof for the engagement of said lock pin of said lock member and a second engagement portion formed contiguously with said first engagement portion;

wherein said control member engages said lock pin with said first engagement portion before said cartridge or said single disk is inserted;

wherein, when said single disk is inserted, said lock member is pivoted by said moving force of said moving member, said moving member being advanced in said inserting direction as said single disk is inserted and engaging said fitting groove of said locking member so that said lock pin is released from said first engagement portion, thereby permitting said lock pin to engage said second engagement portion so as to cancel said locking operation by said lock member, whereby said regulation of said positioning members by said control member is cancelled by moving said control member in a direction opposite to the inserting direction of said single disk; and wherein, when said cartridge is inserted, said moving member is advanced in the inserting direction of said cartridge as said cartridge is inserted and engages said fitting groove of said lock member so that said lock member is pivoted by the moving force of said moving member and said lock pin is released from said first engagement portion and is moved past said second engagement portion, thereby canceling said locking operation by said lock member, whereby said regulation of said positioning members by said control member is cancelled by moving said control member in a direction opposite to the inserting direction of said cartridge.

10. A disk device according to claim 1, wherein said control member comprises a sheet member biased by a spring in a direction opposite to the inserting direction of said cartridge or said single disk, said control member further comprising a regulation pin positioned on end thereof, said biasing member having a depression portion formed therein to engage said regulation pin of said control member, an interlocking lever for dislocating said positioning members in a direction in which said positioning members are brought into contact with said inserted cartridge or said inserted single disk, and an interlocking spring for elastically biasing said interlocking lever so that said positioning members are dislocated in the direction in which said positioning members are brought into contact with said inserted cartridge or said inserted single disk;

wherein before said cartridge or said single disk is inserted, said regulation pin of said control member is engaged with said depression portion of said interlocking lever so that said positioning members are disposed at said standby position; and wherein, when said cartridge or said single disk is inserted, said control member is moved in a direction opposite to the inserting direction of said cartridge or said single disk in accordance with the cancellation of said locking operation by said lock member so that said regulation pin of said control member is removed from said depression portion of said interlocking lever, thereby dislocating said positioning members in the direction in which said positioning members are brought into contact with said inserted cartridge or said inserted single disk by the biasing force of said interlocking spring through said interlocking lever.

11. A disk device according to claim 1, wherein said return member includes a plurality of pulleys disposed adjacent to said slot-shaped guide and a wire wound around said pulleys; and wherein said moving member is connected to said wire, and at least one pulley of said plurality of pulleys is a biasing pulley for biasing said wire to move said moving member in an extracting direction of said cartridge or said single disk, and said biasing pulley is biased by a spring.

* * * * *